M. A. & N. J. CARRIKER.
Bee-Hives.

No. 199,513. Patented Jan. 22, 1878.

WITNESSES
Henry N. Miller
Frank Galt

INVENTOR
M. A. Carriker
and
N. J. Carriker
Alexander Mason
ATTORNEYS

UNITED STATES PATENT OFFICE.

MALACHI A. CARRIKER AND NOAH J. CARRIKER, OF LITCHFIELD, ILLINOIS.

IMPROVEMENT IN BEE-HIVES.

Specification forming part of Letters Patent No. 199,513, dated January 22, 1878; application filed July 19, 1877.

*To all whom it may concern:*

Be it known that we, MALACHI A. CARRIKER and NOAH J. CARRIKER, of Litchfield, in the county of Montgomery, and in the State of Illinois, have invented certain new and useful Improvements in Bee-Hives; and do hereby declare that the following is a full, clear, and exact description thereof, reference being had to the accompanying drawings, and to the letters of reference marked thereon, making a part of this specification.

The nature of our invention consists in the construction and arrangement of a bee-hive, as will be hereinafter more fully set forth.

In order to enable others skilled in the art to which our invention appertains to make and use the same, we will now proceed to describe its construction and operation, referring to the annexed drawing, in which—

Figure 1:
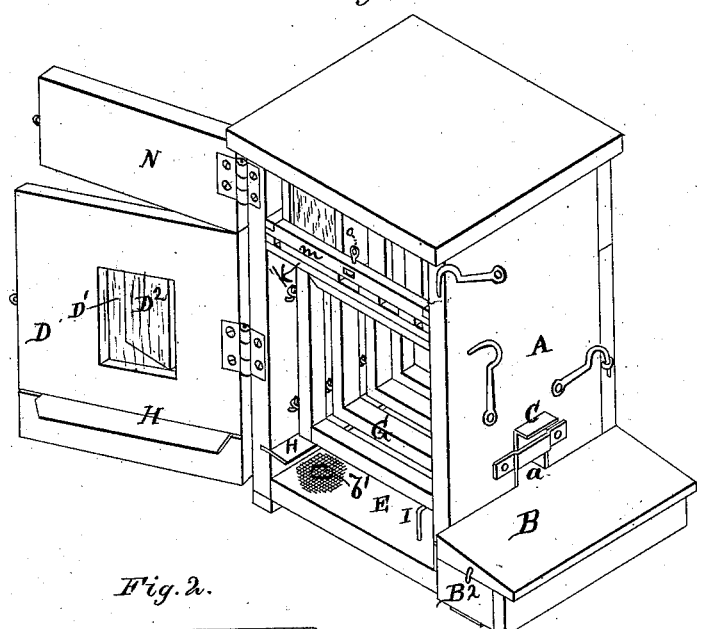
Figure 2:
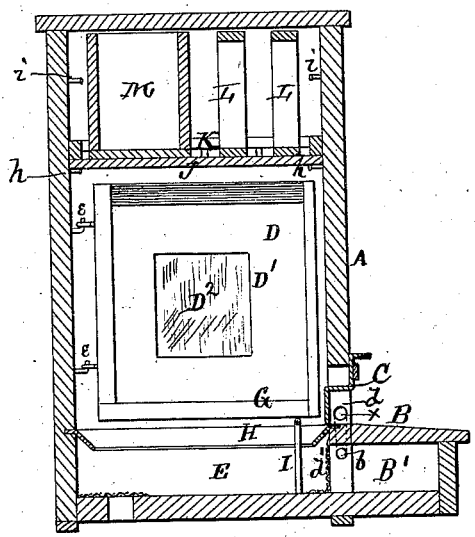
Figure 3:
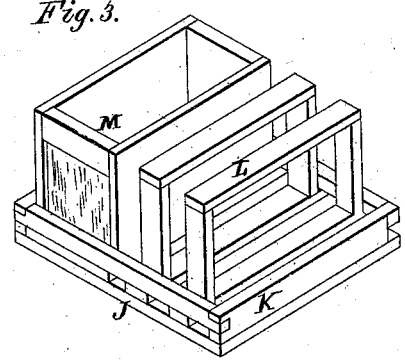

Figure 1 is a perspective view of our bee-hive, with the doors on one side thrown open to show the interior thereof. Fig. 2 is a longitudinal vertical section of the same. Fig. 3 is a perspective view of the division-board, with honey-box and frames.

A represents the box or hive proper, with alighting-board B, at the inner end of which is the entrance $a$ into the hive. Underneath the alighting-board B is formed a chamber, $B^1$, which constitutes a trap for robber-bees, and which can be entered by closing the entrance $a$ by means of the slide C. In the sides of the entrance $a$ are formed passages $b$, which lead into the trap $B^1$; and the slide C, for opening and closing the bee-entrance $a$, is formed with side pieces $d\ d$, having apertures $x$ so arranged that when the entrance $a$ is closed by said slide the apertures $x$ will coincide with the passages $b$, and thus open the same.

The robbers can be removed from the trap by opening a door, $B^2$, at the end thereof.

The hive or box A is on each side provided with a door, D, which allows of the bee-keeper examining and ascertaining the exact condition of the bees in the brood-chamber, by examining half from each side, without disturbing the whole colony, or preventing their working during examination, or going in the way of bees going to or returning from the field, or being exposed to the sting of sentinels of the hive. These doors are also useful in case of swarming, when colonies alight on limbs, bushes, or other movable objects, or when transferring colonies from one hive to another. In such cases the hive is laid down on either side, and the door D on top opened, and the bees shaken into the hive, when the door is closed, the hive adjusted in proper position, and the remaining bees will pass in at the proper entrance, $a$.

In each door D is an opening covered with glass $D^1$, by means of which the bee-keeper may ascertain to some extent the active and healthy condition of the colony without opening the doors D D. These glass plates $D^1\ D^1$ are covered with auxiliary hinged doors $D^2\ D^2$.

In the bottom of the hive are screen-covered openings $b'$ for ventilation, and a screen-covered opening, $d'$, is made between the brood-chamber and the robber-trap $B^1$, to admit the odor from the honey into the trap, and thus the more readily attract the robbers into the trap.

G G are the frames of the brood-chamber, underneath which is a chamber, E, which forms the trap for the moth-larvæ, commonly called the "bee-moth." The moths, as is well known, almost invariably deposit their eggs in holes, cracks, and corners of the hive, where they remain until hatched, when the young moths, in crawling carelessly from their birthplace in this hive, slip or fall on inclined strips H, and roll into the larva-chamber, from whence they are removed as necessary, or, if left there, will die. The strips H are made of tin or other suitable material, and are attached to the inside on all four sides of the hive. The frames G are hinged upon hooks $e$ at the back of the hive, so that they can be swung to either side for examination of the bees, and for destroying any moth-larvæ that might escape to the brood-combs and top of frames. The front ends of said frames are supported upon a wire, I, as shown.

Above the frames G, upon pins $h\ h$ in the walls of the hive, is supported a division-board, J, to prevent any bees entering the upper chamber until the brood-chamber has been filled. On this division-board is a frame, K, open at the sides, in which the frames L and box M are held by their bottom bars extending beyond the sides and entering the open sides of the frame K, and one end of said frame forms a key for fastening the same. This end piece or key $m$, Fig. 1, is removable from the other portions of the frame, and is cut away at the extremities, so as to fit in between the forked ends of the two side pieces of said frame. When the box M and frames L are in position the key-piece $m$ is held by a vertical pin, $o$, which passes through the key-piece and through a looped wire, which is attached to the bottom of the frame K, and is also passed laterally through a slot in the key-piece.

By reversing the board, frames, and box, and supporting the board upon other pins, $i$, in the sides of the hive, the bees are allowed free access to said frames and box. This chamber is on the sides provided with doors N N.

Having thus fully described our invention, what we claim as new, and desire to secure by Letters Patent, is—

1. In a bee-hive, the combination, with the hive A, having bee-entrance $a$, of the alighting-board B, with trap $B^1$ underneath, the passages $b\ b$, and the slide C, having side pieces $d\ d$, with apertures $x\ x$, substantially as and for the purposes herein set forth.

2. The division-board J, provided with the open frame K, and having the frames L and box M held rigidly thereto, in combination with the hive having two sets of supporting-pins, $h$ and $i$, whereby said board, frames, and box may be reversed, substantially as and for the purposes herein set forth.

In testimony that we claim the foregoing we have hereunto set our hands this 27th day of June, 1877.

MALACHI ARMSTRONG CARRIKER.
NOAH JOSHUA CARRIKER.

Witnesses:
CHARLES R. ENOS,
HERBERT A. JONES.